Feb. 20, 1940.          R. R. CLARK ET AL          2,191,069
           METHOD OF MAKING COMPRESSED WOODEN ARTICLES
                       Filed July 9, 1936

Inventor
Ralph R. Clark
Howard G. Swan
by
Walter F. Kaufman
Attorney

Patented Feb. 20, 1940

2,191,069

UNITED STATES PATENT OFFICE 2,191,069

METHOD OF MAKING COMPRESSED WOODEN ARTICLES

Ralph R. Clark and Howard G. Swarr, Lancaster, Pa., assignors to Armstrong Cork Company, Lancaster, Pa., a corporation of Pennsylvania Application July 9, 1936, Serial No. 89,802

6 Claims. (Cl. 144—309)

Our invention relates to a method of making compressed wooden articles and is directed particularly to a method of forming embossed wooden objects having portions on at least one side thereof lying at different levels in the finished article.

One of the major problems in the manufacture of embossed wooden articles resides in the inherent inability of the wood blanks to resist shearing forces applied along a direction parallel to the grain thereof. Another closely related problem is one of cracking of the blanks when the peripheral edge thereof is unsupported during the major portion of the embossing operation, which cracking is due to the development of bending stresses within the blanks, particularly as they are forced into the restricted portion of the die cavity. Hyatt Patent No. 1,322,792 offers no solution to either of these problems and Fletcher Patent No. 1,899,411, while minimizing the deleterious effects of lack of peripheral support, aggravates the former problem by providing, in some instances, narrow shearing surfaces in the cameo portion of the die unit, and in all embodiments, providing a peripherally disposed surface or surfaces lying at a level lower than the remaining portions of the die and striking deeper into the blank. Where these surfaces terminate, shearing forces are applied to the blank in an amount sufficient to shear the blank substantially completely through. When the completed stoppers are finally driven by means of a mallet or mechanical striking head into the bottles which they are to seal, the peripheral portion of the blank is, in many instances, severed by the blow, or the top is cracked along the lines of shear developed by the cameo die member in the forming operation.

By our method, both of these major problems are obviated. Our method contemplates the application of force axially of the blank over substantially the entire surface area of one of the faces of the blank while radial compression is being effected, as by pressing the blank into a die cavity of less cross sectional area than that of the blank. In other words, radial compression is effected without the application of shearing forces to the blank along the axis thereof or parallel to the grain. In our preferred embodiment, we apply radial and axial force to the blank, the axial force being applied substantially parallel to the grain of the wood, to reduce the article to substantially finished dimensions and thereafter, while the partially formed blank is radially confined, we further axially compress the blank in at least a portion of one surface thereof.

We have found that our method eliminates incipient cracks and prevents shearing of the blank through any appreciable portion of the thickness thereof. This is probably due to the fact that upon the initial compression, which is effected by the application of force over substantially the entire area of one of the surfaces of the blank, to reduce the articles to substantially final dimensions, the fibers are compacted into a mass substantially denser than that of the original blank and further axial compression which, while it may be applied by a die which would ordinarily shear the blank, effects only compression of a desired portion because the blank has been rendered resistant to shearing along a direction parallel to the grain by the previously applied axial and radial compression.

Our method may be carried out in a number of different forms of apparatus. For example, the wooden blank may be initially radially and axially compressed into a blank of substantially the desired final thickness, but substantially plane surfaced throughout, and subsequently positioned within a die cavity and additional axial compression applied thereto to emboss the surfaces thereof into the desired configuration. We prefer that the additional compression be effected while the blank is radially confined in order that "flow" of the wood of the blank will not occur which might result in cracking or shearing. We prefer, however, to perform the embossing operation as a step subsequent to the initial compression of the blank, but without removing the blank from the die cavity.

A mechanism suitable for carrying out our method is illustrated in the accompanying drawing in which Figure 1 is an end elevation, partly in section, illustrating a press incorporating a single die cavity;

Figures 1, 2, 3:
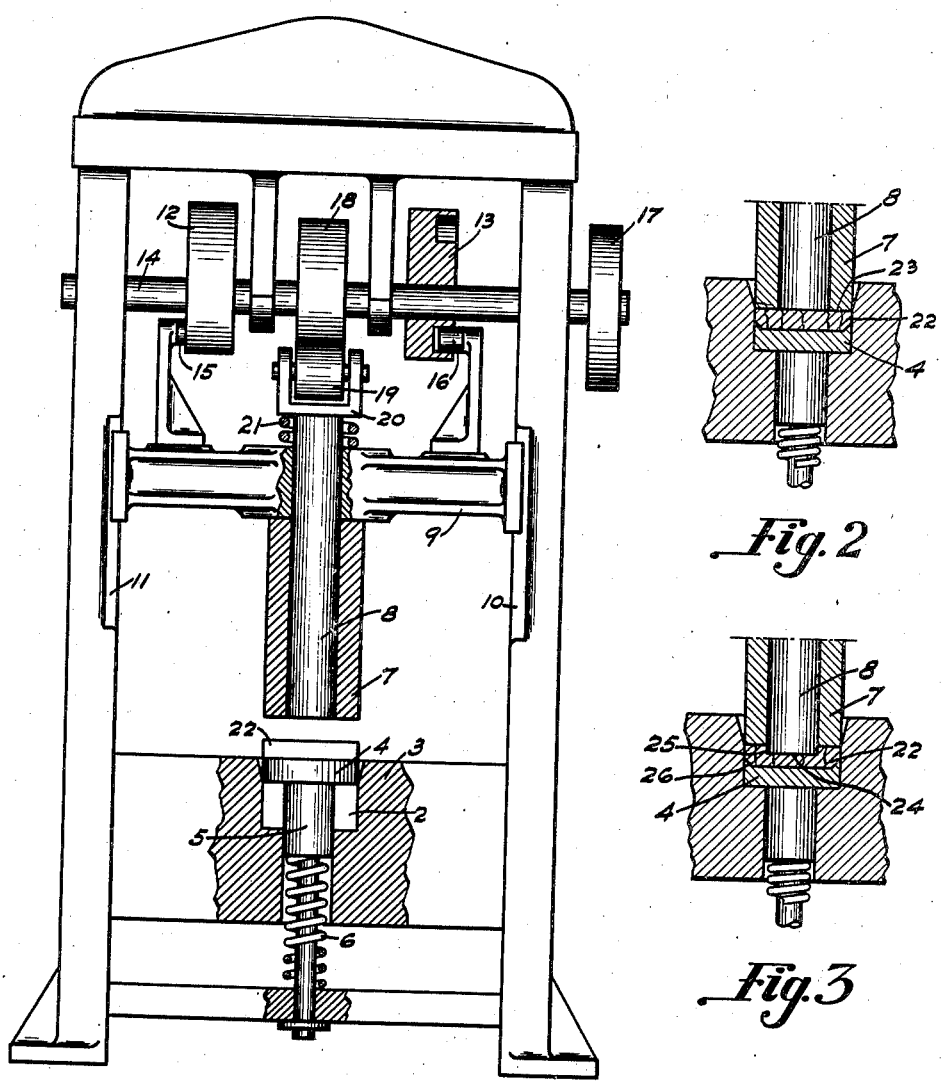
Figure 2 is a detail sectional view showing the die members of Figure 1 in position prior to the application of the final axial compression.
Figure 3 is a similar view showing the relative position of the members after final axial compression.

The embossed article is shown in simple form in the drawing. It will be understood that the invention is applicable to various forms or shapes of articles, whether they be of simple geometric outline or highly ornate and of complicated contour. In Figure 1, a double action embossing press is shown in which a die cavity 2 is provided in a table 3. A die member 4, which in the illustrated embodiment is adapted to form the outer or head portion of an embossed wooden stopper top, is mounted upon a rod 5 which is urged by a spring 6 to normally position the die member 4 flush with the top of the table 3 to facilitate positioning of the blanks and removal of the completed articles. The positioning and removing mechanism has been omitted from the showing of Figure 1 for the sake of clarity. Any suitable mechanism or manual operation may be used.

It will be noted that the cavity 2 has a gradually coverging mouth, the cross sectional area at the top of which is somewhat greater than the cross sectional area of the blank to be operated upon; the cross sectional area gradually diminishing so that in the vicinity of the seated die member 4, which is shown in elevated position in Figure 1 and in seated position in Figures 2 and 3, it is less than the cross sectional area of the blank. The magnitude of the restriction is dependent, to some extent at least, upon the kind of wood being operated upon and the amount of radial compression required. The convergence is gradual in order to prevent the application of excessive stresses to the blank as it is forced into the cavity.

The upper die assembly comprises a sleeve die 7 and a die rod 8. The sleeve 7 is secured to a cross slide 9 mounted for reciprocation in ways 10 and 11. Shrouded cams 12 and 13, secured to cam shaft 14 and having cam rollers 15 and 16 mounted on brackets secured to the cross slide 9, impart reciprocatory movement to the sleeve die 7. In the embodiment shown, rotation is imparted to the cam shaft 14 through a pulley 17 which is suitably connected to a motor or other driving means not shown. The die rod 8 is adapted to be reciprocated by a cam 18 which is secured to the cam shaft 14. Cam follower 19 is secured by bracket 20 to the die rod 8 and is normally urged into engagement with the cam 18 by a spring 21. The cam is so contoured that movement, coincidental with the movement of the cross slide 9, is imparted to the die rod 8 until cams 12 and 13 have moved the sleeve die 7 to its lowermost point, whereupon additional vertical movement is imparted by the cam 18 to the die rod 8 to effect additional compression of the blank by the dieing surface of the die rod 8, while the sleeve die 7 is maintained in its lowermost position by the cams 12 and 13.

In the carrying out of our method with the use of the mechanism shown in Figures 1, 2 and 3, a blank 22 is positioned in axial alignment with the die cavity 2. Rotation is imparted to the crank shaft 14 and the upper die unit is urged into engagement with the blank, thus moving the die 4 downwardly into the cavity 2 and compressing the spring 6. As the blank is moved through the die cavity, it is radially compressed by the restriction thereof and axial compression is effected as the die 7—8 approaches the die 4, compressing the blank therebetween. It will be observed, by reference to Figure 2, that the blank is pressed in the die cavity while supported over substantially its entire surface 23 by the upper die 7—8. The blank is reduced to substantially final dimensions in this operation, after which the cam 18 causes the die rod 8 to further axially compress the blank in a restricted area. In the embodiment illustrated, and with particular reference to Figure 3, it will be noted that the die rod 8 has compressed the blank 22 and has formed therein a depression 24 which, in the embossed wood stopper head shown, is provided to receive a stopper. In prior practice, the upper die unit would be integrally formed with the portion 8 protruding and lying out of the plane of the portion 7 and shearing force would be applied to the blank by the edge 25. By reason of the fact that the blank has been substantially compressed both radially and axially and thus made denser, and since the blank is restricted radially by the die cavity 2 and axially by the lower die unit 4 and the sleeve die 7, the force applied by the die rod 8 to further axially compress the blank is truly a compression force and shearing, beyond the depth of the indenting, does not occur. In the embodiment shown, there is provided a slight chamfering of the blank by the portion 26 of the die. This tends to curl the fibers slightly adjacent that area and reenforces the edge portion of the finished article.

Figure 4:
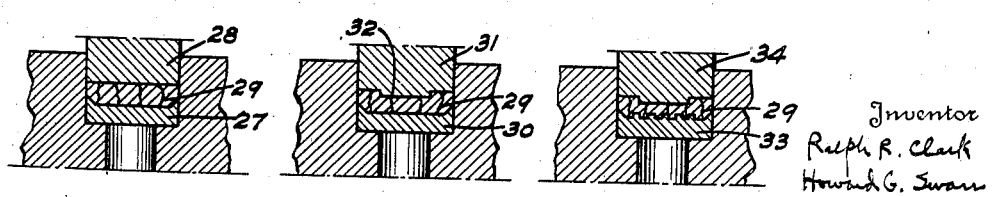
Figure 4 is a diagrammatic view showing our invention in a modified form wherein the initial preforming operation is carried out in one die and the final compression in other dies.

In Figure 4, there is shown diagrammatically, various steps in a modified method of our invention. In this embodiment, the cavity die 27 and the plunger die 28 are each of substantially plane surface for engagement with the blank 29 being operated upon. In the modified process, the first operation is to size the blank to approximately the desired final dimensions by both radial and axial compression. The partially completed blank 29 is then removed from the die cavity and positioned in a second die cavity in which a cavity die 30 supports the blank throughout substantially its entire area and a plunger die 31 is provided with an offset 32 for forming the stopper receiving depression in the head. Subsequent to removal of the blank from this die, it is placed in another die unit in which a cavity die 33 is provided with an intaglio surface for pressing a desired pattern or design on the head of the wooden article and a plunger die 34 is of the same configuration as the plunger die 31. For convenience of operation, a triple head die will be found desirable and the blanks fed continuously thereto would move sequentially from station to station until the finished article is formed. If desired the sizing and embossing of one surface of the blank may be accomplished in a single die cavity and the embossing of the other flat surface carried out in a second cavity. In the embodiment of our invention shown in Figure 4, substantially all radial compression is effected in the first die unit where the blank is sized. In the second die unit the compression will be mainly axially and the article will be radially confined as in the preferred embodiment. In many instances a two step operation will be satisfactory and the intaglio die will be combined with the die unit 30. In some configurations, however, where the embossing to be carried out is relatively deep and lies in a plurality of planes, there is some bending stress which may be avoided if the blank be supported during the compressing of the stopper receiving recess. By so supporting the blank, all bending stresses are avoided and, where the wood is particularly susceptible to shearing and cracking, the three step process is to be preferred.

In the drawing, a bottle closure stopper head has been shown for purposes of illustration. Various articles may be made in accordance with our invention, however, including tokens, buttons, wooden toys and articles of a similar nature having portions on at least one side thereof lying at different levels in the finished article. The articles or blanks may be dyed, coated, waxed or otherwise decorated or treated either prior to or after the embossing operation or coincidental therewith.

While we have illustrated and described certain specific preferred embodiments of our invention, it will be understood that the invention is not limited to the form shown and described but may be otherwise embodied and practiced within the scope of the following claims.

We claim:

1. In the method of making a compressed wooden article having portions on at least one side thereof lying at different levels in the finished article, the steps consisting in axially compressing a wooden blank along a direction substantially parallel to the grain thereof to reduce the article to substantially final dimensions, and thereafter, while radially confining the blank, further axially compressing a portion only thereof to depress a portion of one surface thereof out of the plane of the remainder of said surface.

2. In the method of making compressed wooden articles having portions on at least one side thereof lying at different levels in the finished article, the steps consisting in radially compressing a wooden blank along a direction substantially normal to the grain thereof to reduce the blank to substantially final peripheral configuration, axially compressing the blank along a direction substantially parallel to the grain thereof to reduce the blank to substantially final thickness and thereafter, and while radially confined, further axially compressing a portion of the blank to indent a portion of the surface thereof.

3. In the method of making compressed wooden articles, the steps consisting in radially compressing a blank with the application of force thereto in an axial direction substantially uniformly over substantially the entire area of one of the surfaces of the blank, axially compressing the blank along a direction substantially parallel to the grain thereof to reduce the same to substantially final dimensions and thereafter while supporting the blank radially and axially further axially compressing a portion of the blank to indent such portion to form a surface thereon lying at different levels.

4. In the method of making compressed wooden articles, the steps consisting in compressing a wooden blank radially and axially of the grain thereof to reduce the same to substantially final dimensions and thereafter, while axially and radially confining the blank throughout substantially the entire surface area thereof, further compressing a portion of the blank axially to depress a portion of the surface thereof out of the plane of the remainder of said surface.

5. In the method of making a compressed wooden article having surfaces on each face thereof lying in a plurality of planes, the steps consisting in sizing a wooden blank by compression axially and radially of the grain thereof to reduce the same to substantially final dimensions, depressing a portion of one surface of the blank by further axial compression while supporting the blank radially and axially and thereafter depressing a portion of another surface of the blank by axial compression while supporting the blank radially and supporting the blank completely throughout the opposite face thereof.

6. In the method of making compressed wooden stopper tops, the steps consisting in compressing a wooden blank radially and axially of the grain thereof with the application of compressing force thereto being substantially uniform throughout the surface area of one of the faces of the blank to obviate the application of shearing forces to localized areas thereof, and thereafter, while radially confining the blank, depressing a portion of the surface of one of the faces of the previously compressed blank to form a stopper receiving recess in the blank.

RALPH R. CLARK.
HOWARD G. SWARR.